(12) United States Patent
Zhang et al.

(10) Patent No.: US 9,626,343 B2
(45) Date of Patent: Apr. 18, 2017

(54) CACHING PAGELETS OF STRUCTURED DOCUMENTS

(71) Applicants: Zixiao Zhang, Stanford, CA (US); Xiaoliang Wei, Sunnyvale, CA (US)

(72) Inventors: Zixiao Zhang, Stanford, CA (US); Xiaoliang Wei, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 319 days.

(21) Appl. No.: 13/782,937

(22) Filed: Mar. 1, 2013

(65) Prior Publication Data

US 2014/0033019 A1    Jan. 30, 2014

Related U.S. Application Data

(63) Continuation-in-part of application No. 12/754,549, filed on Apr. 5, 2010, now Pat. No. 8,751,925.

(51) Int. Cl.
| | | |
|---|---|---|
| *G06F 17/00* | (2006.01) | |
| *G06F 17/22* | (2006.01) | |
| *G06F 17/30* | (2006.01) | |

(52) U.S. Cl.
CPC .... *G06F 17/2247* (2013.01); *G06F 17/30902* (2013.01)

(58) Field of Classification Search
CPC .................................................. G06F 17/2247
See application file for complete search history.

(56) References Cited

U.S. PATENT DOCUMENTS

| | | |
|---|---|---|
| 7,594,001 B1 | 9/2009 | Ebbo et al. |
| 8,291,312 B1* | 10/2012 | Zhou ................ G06F 17/30902 709/203 |
| 2002/0073206 A1 | 6/2002 | Jawahar et al. |
| 2003/0120752 A1 | 6/2003 | Corcoran |
| 2004/0177127 A1* | 9/2004 | Seraphin ........................ 709/217 |
| 2005/0050067 A1* | 3/2005 | Sollicito et al. .............. 707/100 |
| 2008/0228772 A1 | 9/2008 | Plamondon |
| 2011/0055683 A1* | 3/2011 | Jiang ............................. 715/234 |
| 2013/0117252 A1* | 5/2013 | Samaddar et al. ........... 707/709 |

OTHER PUBLICATIONS

International Search Report and Written Opinion for PCT/US2014/018827, dated Jun. 13, 2014.

* cited by examiner

*Primary Examiner* — Keith Bloomquist
(74) *Attorney, Agent, or Firm* — Baker Botts L.L.P.

(57) ABSTRACT

Method includes receiving a request for a web page, identifying one or more resource portions stored in a cache, each resource portion corresponding to a portion of a structured document for use to render the requested web page, determining whether the web page was requested within a predetermined time threshold since a previous request for the web page, if requested within the predetermined time threshold, instructing the requested web page to be rendered using the one or more resource portions stored in the cache and refreshing the one or more resource portions, if not requested within the predetermined time threshold, regenerating the one or more resource portions and instructing the requested web page to be rendered using the regenerated one or more resource portions and cache the regenerated one or more resource portions.

18 Claims, 7 Drawing Sheets

CACHING PAGELETS OF STRUCTURED DOCUMENTS

PRIORITY

This application is a continuation-in-part under 35 U.S.C. §120 of U.S. patent application Ser. No. 12/754,549, filed 5 Apr. 2010, which is incorporated herein by reference.

TECHNICAL FIELD

The present disclosure relates generally to rendering structured documents (such as web pages) and, more particularly, to caching pagelets of structured documents and using cached resources for efficiently rendering structured documents and decreasing perceived rendering time.

BACKGROUND

Conventionally, when a request for a web page or other structured document transmitted by a client device is received by a server or computing system hosting the web page, the hosting system typically generates a base web page in the form of an Hyper Text Markup Language (HTML), Extensible Markup Language (XML), or other web browser-supported structured document. The generated structured document is then transmitted in a response to the requesting client via a Hypertext Transfer Protocol (HTTP) or other suitable connection for rendering at the client device. The structured document may include one or more resources (e.g. a JavaScript script or resource, a Cascading Style Sheet (CSS) resource, an image, a video, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource to the client requesting the web page. Typically, upon receipt of the response, the web browser or other client application running at the client device then constructs a document object model (DOM) representation of the received structured document and requests the resource(s) (which may be at one or more other external locations) embedded in the document.

Further, when a user viewing web content at a remote client desires to navigate to a new (or "target") web page from the currently rendered web page (e.g., by clicking on a link within the currently rendered web page, by clicking the back or forward button of a browser application, or by entering the URL of the target web page), the browser responsible for rendering the web content formulates a request for the new web page and transmits the request to a server hosting the new web page. Thus, conventionally, each time a user requests to navigate to a new web page, the browser transmits a request to the server for the full new web page, unloads the currently rendered page, and renders the new web page received from the server in its entirety. Conventionally, this full page loading and unloading scheme would hold true for each subsequent page the user requests. The web page and certain resources embedded in the underlying web page may be located in a browser cache and retrieved locally. However, many dynamic or interactive web pages include content and other resources that may be changed or updated frequently since they were last rendered. Conventionally, if any portion of a cached page is changed, the entire cached page is invalidated and emptied from the cache.

SUMMARY OF PARTICULAR EMBODIMENTS

The disclosed subject matter relates to efficiently rendering web pages and other structured documents using cached resources in conjunction with asynchronous techniques for retrieving updates to the cached resources from remote and/or local data stores. Particular embodiments further relate to systems, methods, and logic for rendering a web page or other structured document that reduces or eliminates the browser overhead associated with reloading content (whether accessed remotely from a server and/or locally from a cache) and re-executing scripts that were downloaded in connection with one or more previously rendered web pages. Particular embodiments utilize various techniques to request only the new content and resources that are necessary to render the target web page without causing a browser or underlying client application to unnecessarily natively re-render the entire web page.

In various embodiments, if the cached resources have changed since being stored in the cache, one or more incremental updates may be generated to refresh the cached resources.

In various embodiments, if the cached resources have changed since being stored in the cache, one or more new replacement resources may be generated to refresh the cached resources.

DESCRIPTION OF EXAMPLE EMBODIMENTS

Particular embodiments relate to efficiently rendering web pages and other structured documents using cached resources in conjunction with asynchronous techniques for retrieving updates to the cached resources from remote and/or local data stores. Particular embodiments further relate to systems, methods, and logic for rendering a web page or other structured document that reduces or eliminates the browser overhead associated with reloading content (whether accessed remotely from a server and/or locally from a cache) and re-executing scripts that were downloaded in connection with one or more previously rendered web pages. Particular embodiments utilize Asynchronous JavaScript and XML (AJAX) techniques to request only the new content and resources that are necessary to render the target web page without causing a browser or underlying client application to unnecessarily natively re-render the entire web page. Particular embodiments relate to a process that may be executed within the context of a browser operated on a client device and that intercepts requests from the browser for a web page, accesses one or more cached resources, and transmits requests for incremental updates to the one or more cached resources to render the web page in an updated form. In various example embodiments, one or more described web pages may be associated with a social networking system or social networking service executing within a web site. However, embodiments of the disclosed subject matter have application to the retrieval and rendering of structured documents hosted by any type of network addressable resource or web site. As used herein, a "user" may be an individual, a group, or an entity (such as a business or third party application).

Figure 1:
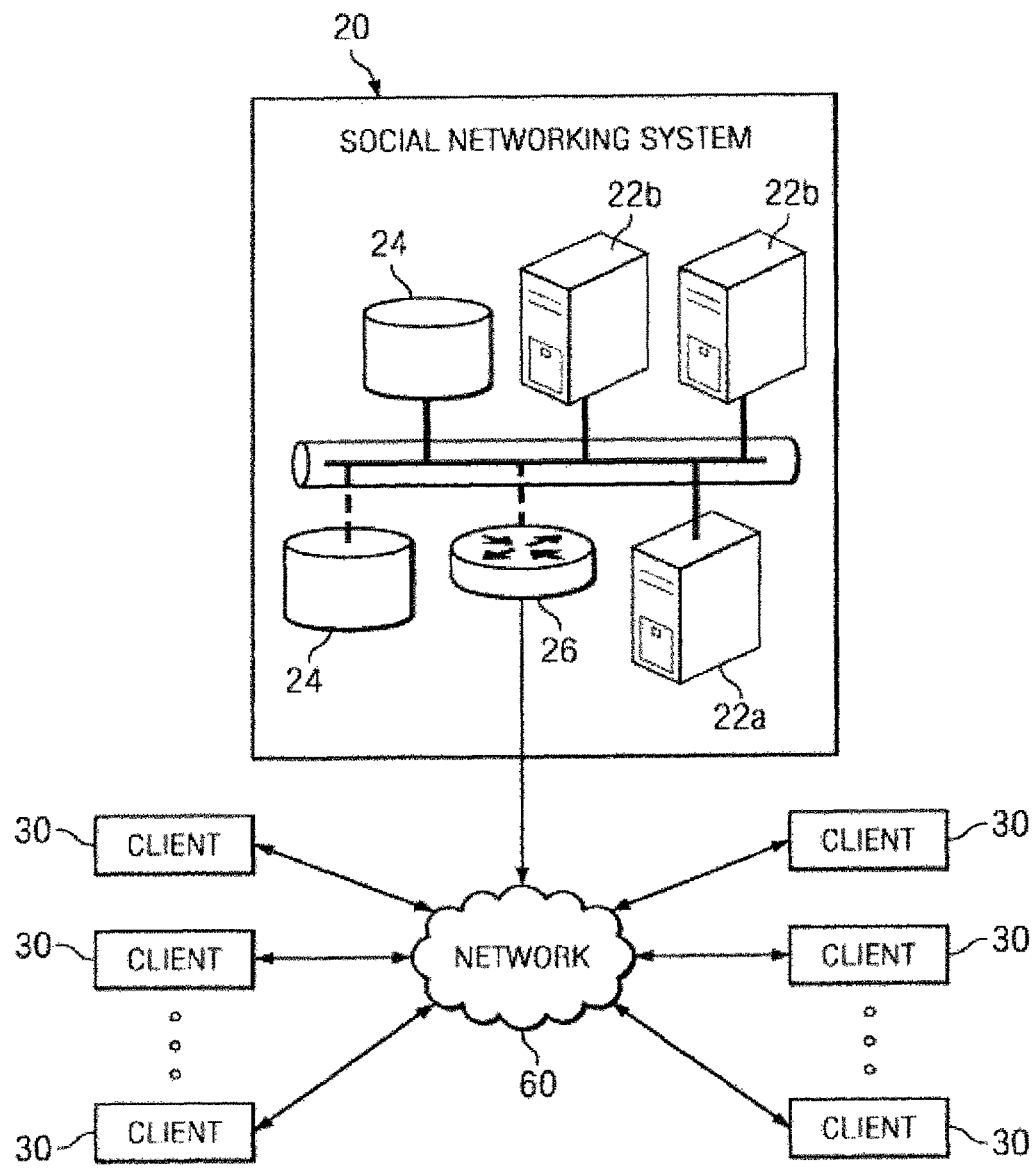
FIG. 1 illustrates an example network environment.

Particular embodiments may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, which maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships or connections between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses may be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that may be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

More particularly, HTML enables developers to embed objects or resources, including web applications, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML may include or may load scripts in languages such as JavaScript, which affect the behavior of HTML processors such as conventional web browsers, and Cascading Style Sheets (CSS), which define the appearance and layout of text and other content. HTML elements are the basic components for HTML and have two basis properties: attributes and content. Each element's attribute and content have certain restrictions that must be followed for an HTML element to be considered valid. An HTML element usually has a start tag (e.g., <element-name>) and an end tag (e.g., </element-name>). The element's attributes are contained in the start tag and content is located between the tags (e.g., <element-name attribute="value">Content<element-name>).

By way of example, HTML elements include structural elements (e.g., describing the purpose of text or other content), presentational elements (e.g., describing the appearance of text or other content regardless of its function), and Hypertext elements (e.g., making part of a document into a link to another document). Most elements may take any of several common attributes. By way of example, the id attribute provides a document-wide unique identifier for an element, the class attribute provides a way of classifying similar elements, and the title attribute is used to attach subtextual explanation to an element. HTML also defines several data types for element content, such as script data and stylesheet data, and numerous types for attribute values, including, by way of example, IDs, names, URIs or URLs, numbers, units of length, languages, media descriptors, colors, character encodings, dates and times, etc.

Document structure elements include the root element (defined by the starting and ending tags <html> and </html>, respectively), head elements (defined by the starting and ending tags <head> and </head>, respectively), and body elements (defined by the starting and ending tags <body> and </body>, respectively). The root element tags <html> and </html> delimit the beginning and end of an HTML document, respectively. All other HTML elements of a given HTML document are included within the root element. The head element tags <head> and </head> generally define a container for processing information and metadata for an HTML document. Example document head elements found within the head element container include, by way of example and not by way of limitation, the base element (defined by starting and ending tags <base> and </base>, respectively), which specifies a base uniform resource locator (URL) for all relative href and other links in the HTML document, the link element (defined by starting and ending tags <link> and </link>, respectively), which specifies links to other documents (e.g., for external CSS files), the meta element (defined by starting and ending tags <meta> and </meta>, respectively), which may be used to specify additional metadata about an HTML document, the object element (defined by starting and ending tags <object> and <object>, respectively), used for including generic objects within the document header, the script element (defined by starting and ending tags <script> and </script>, respectively), which may act as a container for script instructions (e.g., JavaScript) or a link to an external script with the src (source) attribute, the style element (defined by starting and ending tags <style> and </style>, respectively), which specifies a style for the document and which may act as a container for style instructions (e.g., for inlined CSS rules), and the title element (defined by starting and ending tags <title> and </title>, respectively), which defines a document title.

The body element <body> represents a container for the displayable content of an HTML document. Example body elements include, by way of example and not by way of limitation, block elements (e.g., basic text and list elements, among others), inline elements (e.g., anchor and phrase elements), and image and object elements. A script element positioned within the body element may be used to place a script in the document (e.g., the script element may contain instructions to dynamically generate block or inline content). The image element (defined by starting and ending tags <img> and </img>, respectively) may be used to insert an image into the document. By way of example, the image element may include an src attribute that specifies a URL where the image is located. The object element (defined by starting and ending tags <object> and </object>, respectively) may be used to insert an object into the document of the type specified in an included type attribute. Another frequently used HTML element is the frameset element, which may be used as an alternative to the body element.

Generally, a web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

Social networking system 20 may include a multitude of features with which users at remote clients 30 may interact during user sessions. In particular embodiments, these features may be implemented as web applications and may utilize JavaScript and CSS resources requested from servers 22 as well as other external servers or data stores. The web applications or resources may be embedded in various web pages served to remote clients, such as in frames or iFrames, sections or "divs" and the like. In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it may be appreciated that an unlimited number of variations and features may be provided on a social networking system 20.

As described above, a web page or underlying structured document may be segmented or divided into sections logically, visually, or otherwise. By way of example, the structured document used to encode the web page may include one or more block-level elements denoted by starting and ending HTML <div> tags. By way of background, for common web browsers, displayable elements of a web page may be rendered as either block or inline. While all elements are part of the document sequence, block elements appear within their parent elements as rectangular objects, which do not break across lines, and with block margins, and width and height properties, which may be set independently of the surrounding elements. Conversely, inline elements are treated as part of the flow of document text; they cannot have margins, width or height set, and do break across lines. Inline elements cannot be placed directly inside the body element; they must be wholly nested within block-level elements.

As another example, a web page may also be split into one or more frames as structurally specified using HTML Frame elements (e.g., denoted by starting and ending tags <frame> and </frame>, respectively). Frames allow a web browser display window to be split into segments, each of which may show a different document. Another frame element is the inline frame element (denoting by starting and ending tags <iframe> and </iframe>, respectively). An inline frame places another HTML structured document in a frame. Unlike an object element, an inline frame may be the "target" frame for links defined by other elements.

Hereinafter, any logical, structural, or visual section or portion of a web page or the structured document used to encode the web page, such as a block-level element, frame, or inline frame, among others, may hereinafter each be referred to as a "pagelet."

When a user at a client device (e.g., client device 30) desires to view a particular web page (hereinafter also referred to as "target structured document") hosted, at least in part, by social networking system 20, the user's web browser, or other client-side document-rendering engine or suitable client application, formulates and transmits a request to social networking system 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted.

Figure 2:
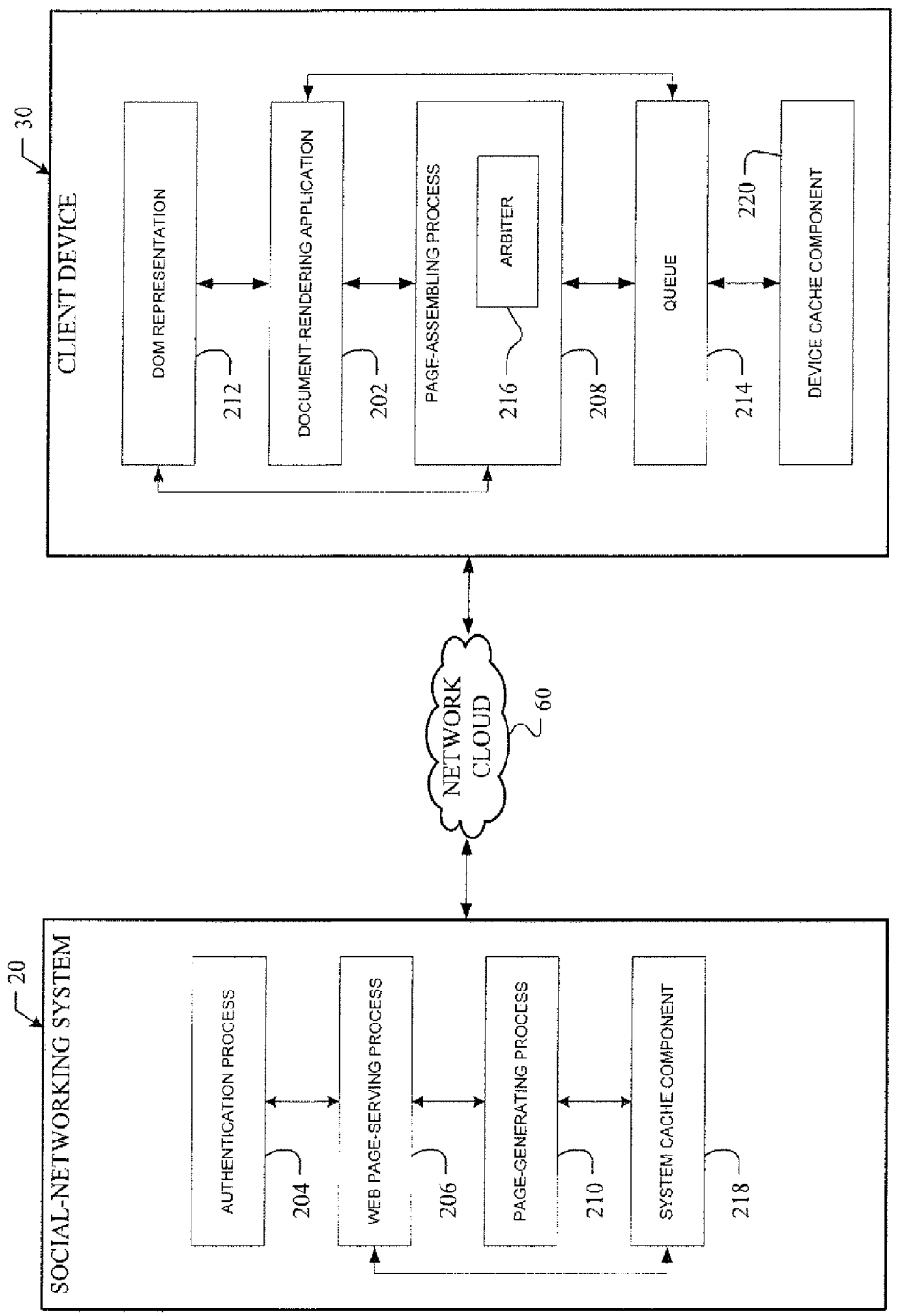
FIG. 2 illustrates a block diagram of example components of the example network environment of FIG. 1.
Figure 3:
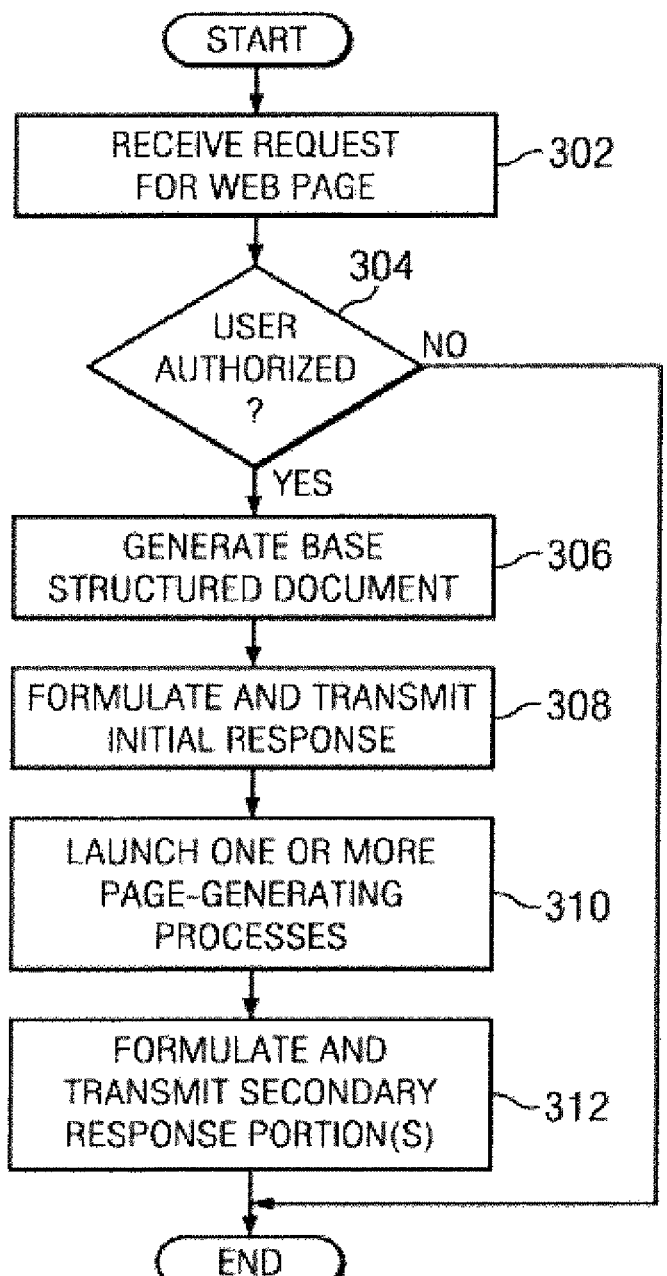
FIG. 3 shows a flowchart illustrating an example method for serving a request for a web page.

A method for serving a request for a web page will now be described with reference to the block diagram of FIG. 2 and the flowchart of FIG. 3. In an example embodiment, the method begins at 302 with receiving, by a server 22 or other computing system in social networking system 20, a request from a client application at a client device 30 for a web page hosted, at least in part, by social networking system 20. As described above, the request generally includes a URL or other document identifier corresponding to the web page location, as well as metadata or other information. By way of example, the request may include information identifying the user of the client application making the request, such as a user ID, as well as information identifying or characterizing the client-side document-rendering application (e.g., web browser) 202 or operating system running on the user's client computing device 30. The request may also include location information identifying a geographic location of the user's client device or a logical network location of the user's client device. The request may also include a timestamp identifying when the request was transmitted. An authentication process 204 may first determine, at 304, whether the user making the request is authorized to receive the requested web page (e.g., has the user successfully logged in and is the user requesting a page for which the user has access or administrative rights).

In particular embodiments, web page-serving process 206 then analyzes the request and generates, at 306, a base (skeletal) structured document using markup language code (e.g., HTML, XML, or other suitable markup language code). In particular embodiments, the base structured document includes a head element (e.g., an HTML head element) and a body element (e.g., an HTML body element). In particular embodiments, the head element includes an executable code segment for implementing a page-assembling process 208 at the requesting client 30. In particular embodiments, the executable code segment for implementing the page-assembling process 208 is a JavaScript code segment and includes a JavaScript function library. The head element may also include one or more initial resources (e.g., JavaScript or CSS) or references to such resources (e.g., in the form of script, image, or object elements having corresponding source (src) identifiers for locating the selected resources) to be downloaded from external locations (e.g., third party sites). In particular embodiments, it is desirable to minimize the number of initial resources included in the base structured document (e.g., to expedite the transmitting of the base structured document to the requesting client 30). In particular embodiments, the body element includes markup language code for rendering one or more placeholders once received by the requesting client 30. In particular embodiments, page-serving process 206 adds a placeholder into the base structured document for each of one or more (there are generally a plurality) pagelets to be transmitted to the client 30 in corresponding second responses, as will be described in more detail below. The body element may also include resources, references to resources, or even content to be rendered once received by the requesting client 30 (although, again, in particular embodiments the resources, reference to resources, or content are minimized in the base structured document). In particular embodiments, web page-serving process 206 then formulates and transmits an initial response or initial response portion (hereinafter also referred to as a "first response" or "first response portion") at 308 to the requesting client 30 that includes the base structured document (It should be noted that in some embodiments, some data such as, for example, pre-fetching instructions may be transmitted to the client prior to transmitting the initial/first response/response portion). The initial response may be transmitted to the requesting client 30 over an HTTP or any other suitable connection. In particular embodiments, the connection over which the initial response is transmitted to the client 30 is a persistent Transmission Control Protocol (TCP) connection. As will be described below, this enables the client 30 to receive, and to begin processing of, the base structured document and to initialize or download the resources in the initial response while the remainder of the requested web page is generated.

In particular embodiments, after, or even at least partially in parallel, with generating the base structured document at 306 or transmitting the initial response at 308, web page-serving process 206 launches, at 310, page-generating process 210 and instructs it to generate the remainder of the requested web page. In one particular embodiment, page-generating process 210 comprises a master process that administers a plurality of subpage-generating processes that are each configured to generate an assigned subportion of the webpage. That is, in particular embodiments, each of one or more subpage-generating processes begins generating an assigned pagelet in parallel with the other subpage-generating processes. In one particular embodiment, as each subpage-generating process completes the generation of its assigned pagelet, page-generating process 210 passes the pagelet to page-serving process 206, which then formulates and transmits the pagelet as a secondary response or secondary response portion (hereinafter also referred to as a "second response" or "second response portion") at 312 to the requesting client 30. In an alternate embodiment, page-serving process 206 may comprise page-generating process 210 and may generate each secondary portion sequentially in-process, which may generally not involve launching one or more other page-generating processes. It should be noted that, while described as a single step 312, step 312 may generally include the formulating and transmitting of a plurality of pagelets in a plurality of corresponding secondary responses sent in series or parallel to client 30, and in some embodiments, as each pagelet is generated. As described above, each secondary response may be transmitted to the client 30 over the same persistent TCP or other suitable connection over which the initial response was transmitted. In one embodiment, the body element of the base structured document may not be closed with an ending tag, and as such, each secondary response may be transmitted as a later-generated and later-transmitted part of the body element of the base structured document. In another embodiment, one or more of the secondary responses may be transmitted as one or more independent HTML responses.

In particular embodiments, when the requesting client 30, and particularly document-rendering application 202 (e.g., a web browser) receives the initial response, document-rendering application 202 processes the initial response and the base structured document and generates a model representation of the base structured document in memory at the client 30. By way of example, document-rendering application 202 may generate a Document Object Model (DOM) representation 212 of the base structured document. As will be appreciated by those of skill in the art, when document-rendering application 202 generates the DOM representation 212, it essentially translates the markup language code into a DOM tree or DOM hierarchy of DOM elements or nodes, each of which may include or contain resources, references for resources, content, among other possibilities. In particular embodiments, the base structured document is configured such that document-rendering application 202 generates one or more DOM nodes for each of the place-holders specified in the base structured document. Hereinafter, these DOM nodes may be referred to as "place-holder DOM nodes."

Generally, each place-holder DOM node doesn't include any resources, references for resources, or content to be displayed, however, these place-holder DOM nodes, when rendered by document-rendering application 202 and generally displayed essentially reserve places in the rendered base structured document in which subsequently received resources, references for resources, or content in associated pagelets in subsequently received secondary responses will be displayed, initialized, or executed, as will be described in more detail below.

In particular embodiments, the code segment (e.g., JavaScript) for implementing page-assembling process 208 is initialized upon being processed by document-rendering application 202. Upon being initialized, page assembling process 208 may then wait for subsequently received secondary responses described above. Any other resources, or references to resources, included in the initial response may also be processed, initialized, executed, or downloaded upon being received by document-rendering application 202.

In particular embodiments, as each of the secondary response are received by document-rendering application 202, page-assembling process 208 may place the contents of each corresponding pagelet in queue 214 (which may be implemented in a temporary or other suitable memory location accessible by page-assembling process 208 or document-rendering application 202). Subsequently, page-assembling process 208 may, for each received secondary response, identify a corresponding place-holder DOM node (or nodes) in the DOM representation 212 and dynamically insert or swap the contents of the pagelet into the DOM representation 212 at or in place of the corresponding place place-holder DOM node. In particular embodiments, the page-assembling process 208 may dynamically insert or swap the contents of the pagelet into the DOM representation 212 in conjunction with the document-rendering application 202; that is, the document-rendering application 202 may actually insert or swap the contents in response to a call from page-assembling process 208. It should be noted that this insertion or swapping may involve the generation of additional DOM nodes in the DOM representation 212 (e.g., the generation of lower order DOM nodes in the DOM representation 212 at or below the level of the place-holder DOM node corresponding to the pagelet). As the contents of each secondary response is inserted into the DOM representation 212, the content or resources inserted may then be rendered, executed, initialized, or downloaded for rendering by document-rendering application 202 and displayed to the user.

In particular embodiments, a device cache component 220 will cache, for example within temporary memory or a persistent storage at client 30, the pagelets received by document rendering application 202 so that one or more of these resources may be utilized when a user, for example, reloads a currently rendered web page or navigates away from a currently rendered web page to another web page or pages and then desires to return to a previously rendered web page, as discussed in more detail below. In some embodiments, device cache component 220 may store information, such as whether the pagelet is cacheable, whether the pagelet has been previously cached, when the pagelet was previously cached and/or whether the cached pagelet has been updated on the server 22 and thus may be due to be updated on the client 30.

In particular embodiments, each pagelet includes, or is in the format of, a function call that is configured to call page-assembling process 208 once received by the client 30. In particular embodiments, page-assembling process 208 includes a function library (e.g., a JavaScript function library) that includes (e.g., JavaScript) functions that are to be, or may be, called by function calls in the subsequently received secondary responses. In particular embodiments, each pagelet includes some markup language code (e.g., HTML) including a script for implementing the corresponding function call and that identifies the functions required by the function library of page-assembling process 208. In particular embodiments, each function call includes one or more arguments wrapped in one or more callback functions including, by way of example, HTML or other markup language code, an array of JavaScript resources, an array of CSS resources, and a register that includes a list of (e.g., JavaScript) scripts or code segments to be executed after the pagelet is displayed and the resources identified in the pagelet are downloaded.

In particular embodiments, each function call further includes some metadata describing some properties of the pagelet and that may be used by page-assembling process 208 to determine a relative priority of the pagelet. This enables page-assembling process 208 to schedule a relative display order of each of the pagelets received in the secondary responses. By way of example, some pagelets may enable features that are predetermined to not be critical, or not as critical as other features or content, and as such, these pagelets may be rendered after other more critical pagelets. In one simple implementation, each function call further includes a "delay flag." When this delay flag is set to true, this instructs page-assembling process 208 that the pagelet is not relatively critical and its insertion into the DOM representation 212 and subsequent rendering by document-rendering application 202 may be delayed until other higher priority pagelets are inserted and rendered. More particularly, and as will be described in more detail below, each pagelet callback function, when received at the client 30, may be held in queue 214 until other higher priority pagelet callback functions are processed or executed. However, in some embodiments, if there are no higher priority pagelets in queue 212, a lesser priority pagelet callback function may be processed.

In particular embodiments, as described above, to insert the contents of a particular pagelet received in a secondary response into the DOM representation 212, page-assembling process 208 must identify the corresponding place-holder DOM node in the DOM representation 212. In particular embodiments, this is achieved by including, by page-serving process 206, an identifier (ID) parameter with each place-holder in the base structured document. Similarly, each pagelet generated by page-generating process 210 includes an ID parameter usable by page-assembling process 208 to identify the matching or corresponding place-holder DOM node in the DOM representation 212 into which, or at which, the contents of the pagelet are to be inserted or swapped. Further details regarding generation and delivery of structured documents may be found in U.S. patent application Ser. No. 12/754,549, which is incorporated by reference herein in its entirety.

Figure 4A:
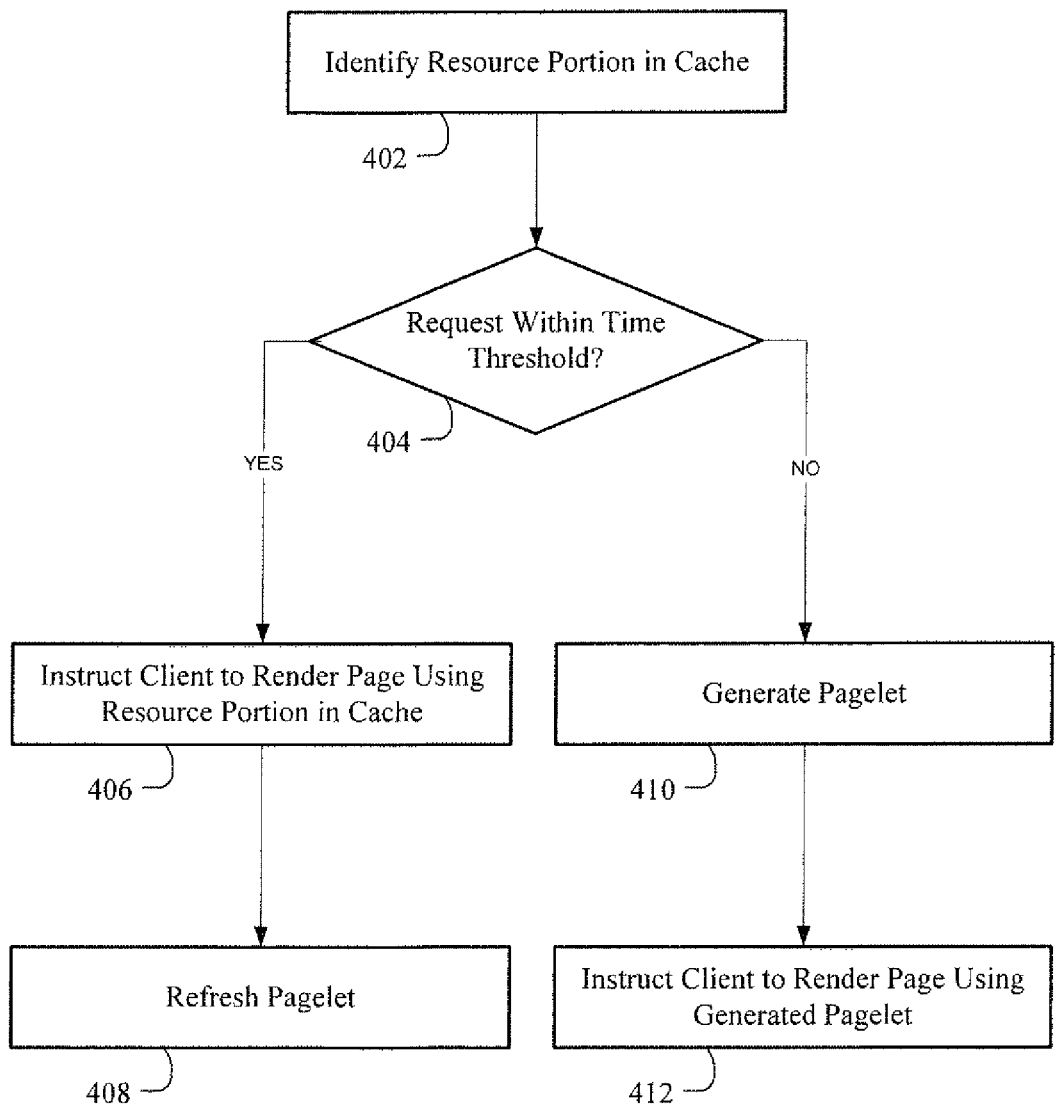
FIG. 4A shows a flowchart illustrating an example method for serving a pagelet for a web page.

A method for serving a pagelet will now be described with reference to the flowchart of FIG. 4A. As described above, in response to a web page request, after or in parallel with generating the base structured document at 306 or transmitting the initial response at 308, web page-serving process 206 launches, at 310, page-generating process 210 and instructs it to generate the remainder of the requested web page. In particular embodiments, in the event that the requested web page has been previously rendered, and thus has corresponding pagelets that have been cached or stored in a cache by client 30 for use in rendering the web page (a "cache hit"), web page-serving process 206 may instruct client 30 to render the pagelet, at least in part, using the cached resources. By way of example, referring to FIG. 4A, when a client device 30 requests a web page that has been previously rendered, web page-serving process 206 may first determine at 402 if there is a cache hit; that is, if the requested web page was previously rendered by client 30 and stored in the cache, web page-serving process 206 may identify one or more pagelets or pagelet resources stored in the cache to be used in rendering the web page. In an example embodiment, if there is not a cache hit, web page-serving process 206 launches page-generating process 210 and instructs it to generate the remainder of the requested web page, as described herein.

In particular embodiments, web page-serving process 206 may store a timestamp that indicates when requests for the web page were transmitted to the servers, when the response or responses were provided from the server 22, and/or when the web page was rendered the client 30. After one or more pagelets stored in the cache are identified, web page-serving process 206 may determine that some or all of the cached pagelets are out of date, and thus obsolete. For example, at 404, web page-serving process 206 may compare the timestamp of the current request for the web page to the timestamp that the previous request for the web page was made to determine whether the time elapsed between the timestamp for the current request and the timestamp for the previous request exceeds a predetermined time threshold. The predetermined time threshold can be any desired time, for example and without limitation 5 minutes.

In particular embodiments, system cache component 218 may monitor and/or record one or more state-changing operations, such as writing additional data, performed on pagelets that have been stored in the cache of device 30. By way of example, system cache component 218 may store the state-changing operation (in one embodiment, embodied as an object in an embedded script) in association with the callback function registered by the embedded script within the corresponding data object stored for the pagelet on which the operation was performed. In this way, when the user navigates away from the page in which the operation was performed and later navigates back to the page in which the operation was performed, system cache component 218 may instruct web page-generating 206 to send the callback function as a secondary response portion to client 30, which then re-executes the operation in the context of the cached page. In response to a cache hit for a page in which a state-changing operation has been previously performed, page-generating process 208 may access the corresponding data object and reload or reexecute the cached resources for the page as discussed herein. In some embodiments, web page-serving process 206 or system cache component may determine that a cached pagelet is obsolete based at least in part on the received state-change information.

Figure 5:
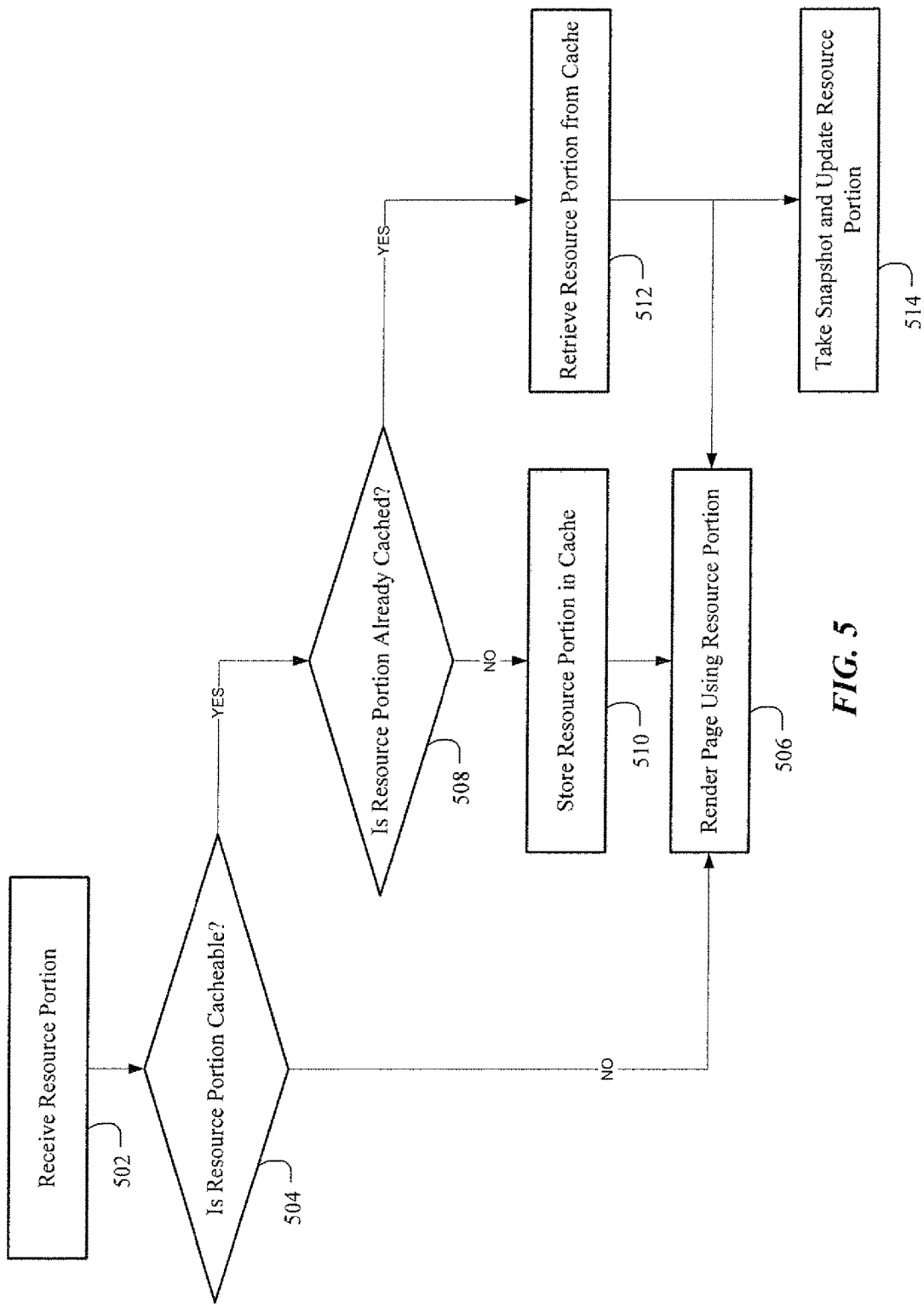
FIG. 5 shows a flowchart illustrating an example method for rendering a pagelet.

In particular embodiments, if it is determined at 404 that the cached pagelet is not obsolete, at 406, web page-serving process 206 may instruct client 30 to render some or all of the pagelet from the cache, as discussed further below with respect to FIG. 5. For example, web page-serving process 206 may send a secondary response to the client 30 indicating that some or all of the resources to be used for rendering the pagelet are stored in the cache.

Figure 4B:
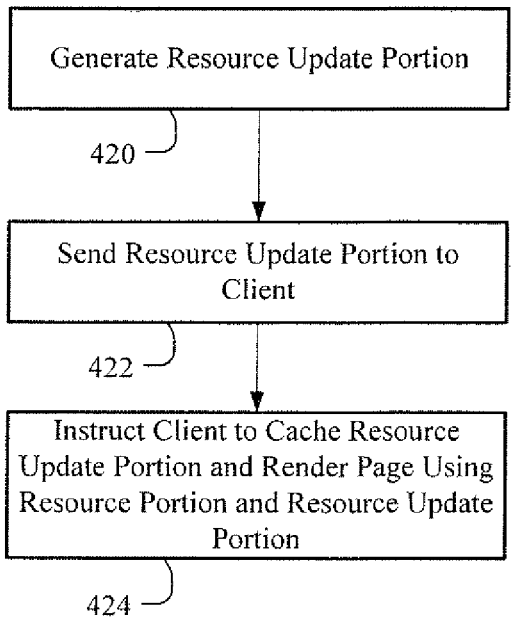
FIG. 4B shows a flowchart illustrating an example method for refreshing a pagelet.
Figure 4C:
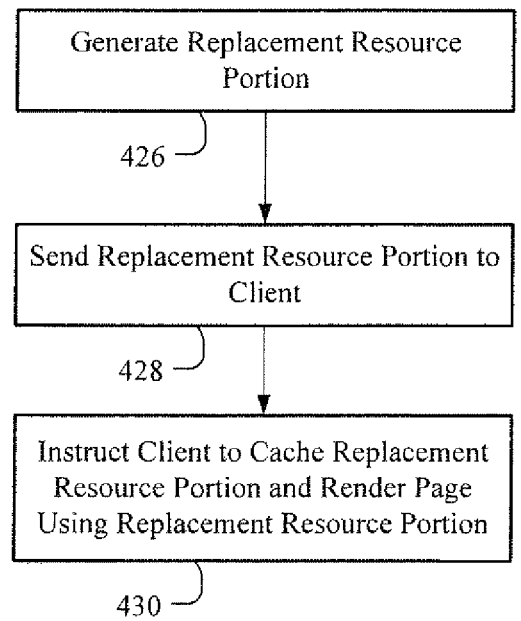
FIG. 4C shows a flowchart illustrating a further example method for refreshing a pagelet

In particular embodiments, at 408, once the client 30 has rendered some or all of the pagelet from the cache, web page-serving process 206 may instruct page-generating process 210 to refresh the pagelet, as discussed further below with respect to FIGS. 4B and 4C. In some embodiments, web page-serving process 206 may cause the pagelet to be refreshed in response to a request by client 30 to refresh the pagelet.

In particular embodiments, at 410, if it is determined that the cached pagelet is obsolete, web page-serving process 206 may instruct page-generating process to generate the pagelet as a new pagelet without utilizing any cached resources. At 412, web page-serving process may instruct client 30 to render the web page using the pagelet generated at 410 and not from the cache, for example, as discussed herein, by sending the pagelet to the cache as part of a secondary response to the client 30.

An example method for refreshing a pagelet will now be described with reference to the flowchart of FIG. 4B. Web page-serving process 206 may instruct page-generating process 210 to refresh a pagelet that has been rendered, at least in part, from the cache. By way of example, client 30 may request incremental updates for resources required by the corresponding application that have changed since the page, and more particularly the pagelet, was last rendered by client 30. In particular embodiments, a pagelet function call includes the corresponding timestamp for the resources required for rendering the corresponding application within the request. In particular embodiments, web page-serving process 206 and/or system cache component 218 may determine whether there have been any updates to the corresponding resources since the resources were last transmitted to the client 30 and rendered based on the corresponding timestamps.

In particular embodiments, at 420, web page-serving process 206 may instruct page generating process 210 to generate one or more incremental updates for the cached resource or resources of the pagelet to client 30, for example if those resources have changed since the timestamp transmitted with the request. That is, in contrast to conventional caching procedures in which a web page is considered as a whole and in which any change in the web page results in a flushing of the page from the client-side cache, individual pagelets may request incremental updates via their corresponding function calls without the whole web page being re-requested. By way of example, if a resource has been changed or updated, page-generating process 210 may generate incremental data (or difference data indicating the changes to the underlying data) used to update a resource cached at the client 30.

In particular embodiments, at 422, web page-serving process 206, upon generation of the updated resources (if any) from page-generating process 210, may send the updated resources to the client 30, for example as part of a secondary response portion, as discussed herein. At 424, web page-serving process 206, may instruct client 30 to render the page using the updated resources and the cached resources. For example, the secondary response portion may include instructions to insert the updated resources into the page by page-assembling process 208, as discussed herein. By way of example, this may involve inserting updated HTML or other content into a corresponding pagelet or other section of the rendered page or executing the updated scripts for use in rendering the page. In this manner, the cached resources may be rendered and displayed to a user before, or at least partially in parallel with, the generation of the updated resources. Once the updated resources are received, the page-assembling process may render the pagelet including the updated resources. Additionally, the secondary response portion may include instructions to cache the updated resources in the cache of client 30.

A further example method for refreshing a pagelet will now be described with reference to the flowchart of FIG. 4C. Rather than generating one or more incremental updates for cached resources of a pagelet, at 426, web page-serving process 206 may instruct page-generating process 210 to generate one or more new replacement resources to replace the cached resources with new versions. This may occur each time a cached resource is used to render the web page, if the cached resources have changed since the timestamp transmitted with the request and/or upon a request from client 30, as described herein.

In particular embodiments, at 428, web page-serving process 206, upon generation of the new replacement resources (if any) from page-generating process 210, may send the updated resources to the client 30, for example as part of a secondary response portion, as discussed herein. At 430, web page-serving process 206, may instruct client 30 to render the page using the new replacement resources. For example, the secondary response portion may include instructions to insert the new replacement resources into the page by page-assembling process 208, as discussed herein. By way of example, this may involve replacing the corresponding pagelet by replacing HTML or other content of the corresponding pagelet or other section of the rendered page or executing replacement scripts for use in rendering the page. In this manner, the cached resources may be rendered and displayed to a user before, or at least partially in parallel with, the generation of the replacement resources. Once the replacement resources are received, the page-assembling process may render the pagelet using the replacement resources. Additionally, the secondary response portion may include instructions to cache the new replacement resources in the place of the corresponding pagelet in the cache of client 30.

A method for rendering a pagelet will now be described with reference to the flowchart of FIG. 5. In particular embodiments, at 502, when a pagelet is received in a secondary response, the corresponding function call calls page-assembling process 208. At 504, page-assembling process, alone or in communication with a device cache component 220, may perform a check to determine if the received pagelet is a cacheable pagelet. For example, the function call may include instructions, such as a flag, to indicate that the pagelet includes cacheable resources. By way of example, cacheable resources may include resources, such as navigation menus, news feed information or other resources that are generally reloaded when a user leaves and then returns to the web page. Some pagelets may not include resources that are cacheable. For example, for some pagelets, it may be desired to request new resources each time the page is loaded, such as for pagelets that display advertisements, where it may be desired to render a different advertisement each time a user returns to the same page.

In particular embodiments, if at 504 device cache component 220 determines that a pagelet is not cacheable, at 506, page-rendering component 208 may proceed to render the pagelet as described herein, without caching the pagelet and without using any cached resources to render the pagelet.

In particular embodiments, if at 504 device cache component 220 determines that a pagelet is cacheable, at 508, device cache component 220 may then perform a check to determine if the received pagelet has previously been cached. For example, the function call may include instructions, such as a flag, to indicate that the pagelet has been previously cached. Additionally or alternatively, the device cache component 220 may register each cached pagelet with unique identification information for each pagelet and determine from the unique information whether the pagelet has been previously cached. The function call and/or the device cache component 220 may also include information about when the pagelet was cached.

In particular embodiments, if at 508 device cache component 220 determines that the received pagelet has not previously been cached, device cache component 220 may store the pagelet in the cache of client 30. By way of example, storing a received pagelet in the cache may include storing the pagelet in persistent memory of the client 30, such as on a mass storage drive. Storing the received pagelet may also include encrypting the pagelet and storing the encrypted pagelet in the cache. Encrypting the pagelet may prevent copying, tampering or reverse engineering of the pagelet, should the pagelet cache data remain in the persistent memory after the web browsing session has ended. Encrypting the pagelet may include encrypting the pagelet data using an encryption library, for example and without limitation, the Stanford Javascript Crypto Library. Additionally or alternatively, storing the pagelet may include storing the pagelet in transient memory, such as in system memory or on-chip processor cache memory of client 30. At 506, page-rendering component 208 may then proceed to render the pagelet as described herein.

In particular embodiments, if at 508 device cache component 220 determines that the received pagelet has previously been cached, at 512, device cache component 220 may retrieve the cached pagelet, or cached resources corresponding to a portion of the cached pagelet, from the cache of client 30. If the cached pagelet is encrypted, retrieving the cached resources may include decrypting the cached resources before they may be utilized by page-generating process 208. Once the cached resources are received, at 506, page-rendering component 208 may then proceed to render the pagelet using the cached resources as described herein.

In particular embodiments, after or at least partially in parallel with rendering the pagelet, at 514, device cache component 220 may take a snapshot of the pagelet. Such a snapshot may include taking a snapshot of DOM information and/or function call data for each received pagelet. The snapshot may be sent to server 22, for example as part of a request to update the pagelet. The pagelet rendered using cached resources may be refreshed, as discussed herein, to include new information that has been added since the pagelet resources were cached. In this manner, the cached pagelet may be rendered and displayed to the user, and after or at least partially in parallel with rendering the cached pagelet, the pagelet may be refreshed to include the new information, if any. As such, the user may perceive the pagelet being loaded sooner than if the pagelet resources all were downloaded from the server rather than retrieved from the cache.

In particular embodiments, at 506, with the received pagelet and/or cached resources being sent to page-assembling process 208 as discussed herein, page-assembling process 208 then may put the corresponding pagelet callback function in queue 214, which may already contain pagelet callback functions corresponding to previously received pagelets received in previous secondary responses. Further details regarding handling pagelet callback functions, including rendering pagelets and inserting pagelets into a web page, may be found, for example, in U.S. patent application Ser. No. 12/754,549, which is incorporated by reference herein in its entirety.

In particular embodiments, the cache of device 30 may be erased periodically or after certain events. For example, device cache component 220 may be configured to erase the cache upon an instruction by the user to erase the cache. Additionally or alternatively, device cache component may be configured to erase the cache after certain events, such as when the user logs off from the web site or when a certain period of time elapses since the user logged on the web site or when the cache was created.

As described herein, any of the described processes or methods may be implemented as a series of computer-readable instructions, embodied or encoded on or within a tangible data storage medium, that when executed are operable to cause one or more processors to implement the operations described above. For smaller datasets, the operations described above may be executed on a single computing platform or node. By way of example, in particular embodiments, the phased generation processes described above with reference to FIGS. 2 and 3 may be implemented by a single server process executing in server 22. That is, the web page generation and serving processes described above may be implemented on server 22. For larger systems and resulting data sets, parallel computing platforms may be used.

FIG. 1 illustrates an example distributed computing system, consisting of one master server 22a and two slave servers 22b. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software may restart the application on one or more other nodes.

Multiple nodes also facilitate the parallel processing of large databases. In some embodiments, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms may be implemented by a wide variety of physical systems and in a wide variety of network and computing environments, the server or computing systems described below provide example computing system architectures for didactic, rather than limiting, purposes.

Figure 6:
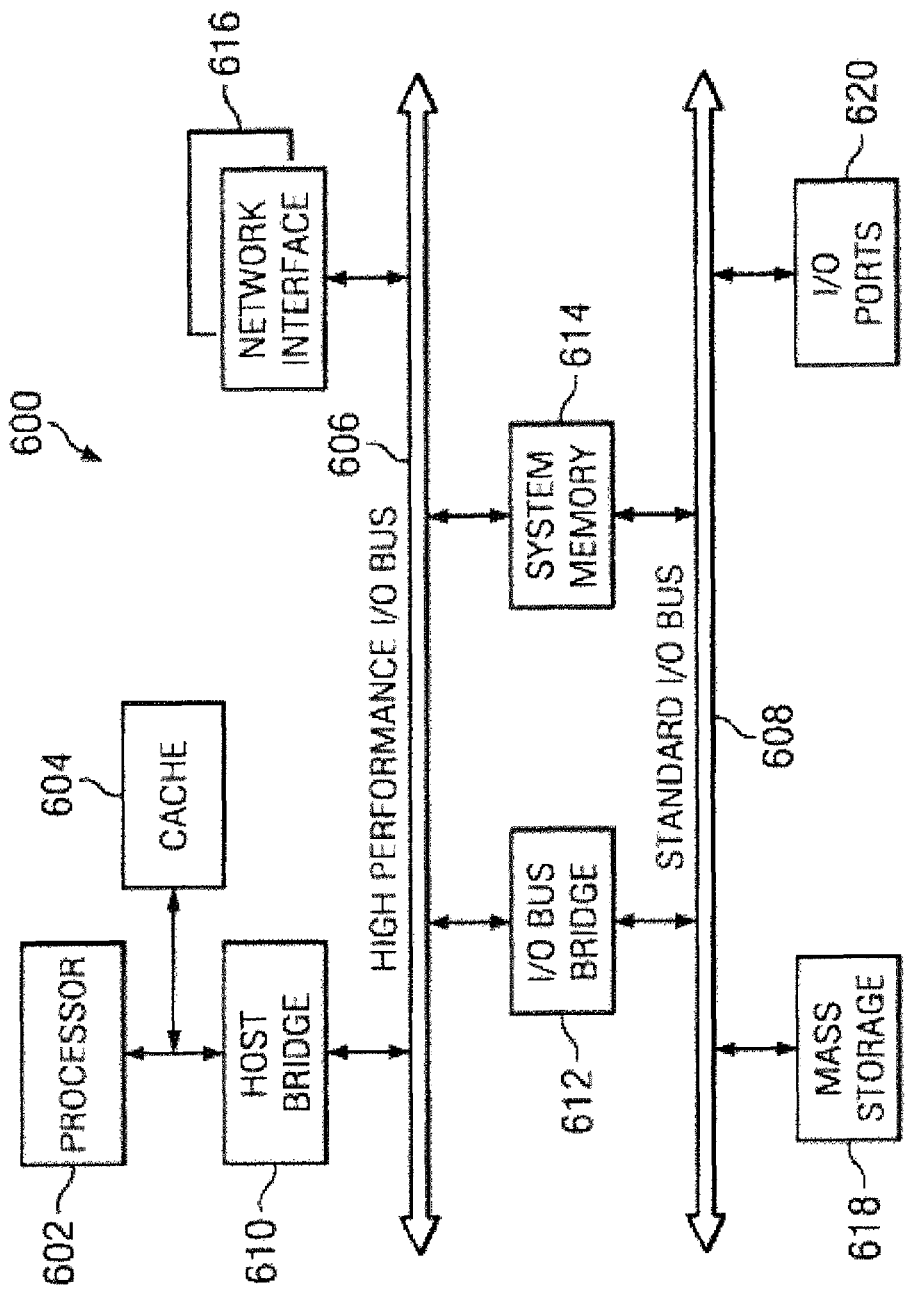
FIG. 6 illustrates an example computer system architecture.

FIG. 6 illustrates an example computing system architecture, which may be used to implement a server 22a, 22b, or a client device 30. In one embodiment, hardware system 600 comprises a processor 602, a cache memory 604, and one or more executable modules and drivers, stored on a tangible computer readable medium, directed to the functions described herein. Additionally, hardware system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network/communication interfaces 616 couple to bus 606. Hardware system 600 may further include video memory (not shown) and a display device coupled to the video memory. Mass storage 618, and I/O ports 620 couple to bus 608. Hardware system 600 may optionally include a keyboard and pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in the servers 22a, 22b, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures; and various components of hardware system 600 may be rearranged. For example, cache 604 of client 30, may be implemented on-chip with processor 602. Alternatively, cache 604 may be implemented in the system memory 614 of client 30. In this manner, a cache 604 implemented on a processor chip or in system memory 614 may generally be implemented in transient storage. As a further alternative, cache 604 may be implemented in mass storage 618 of client 30, which may be a persistent storage device.

Furthermore, certain embodiments of the disclosed subject matter may not require nor include all of the above components. For example, the peripheral devices shown coupled to standard I/O bus 508 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

In one implementation, the operations of the embodiments described herein are implemented as a series of executable modules run by hardware system 600, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 602. Initially, the series of instructions may be stored on a storage device, such as mass storage 618. However, the series of instructions may be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 616. The instructions are copied from the storage device, such as mass storage 618, into memory 614 and then accessed and executed by processor 602.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations may be comprised of instructions that are stored on storage media. The instructions may be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosed subject matter. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present disclosed subject matter may be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
   receiving, by a server computing system, a request for a web page from a client computing device;
   identifying, by the server computing system, one or more resource portions stored in a cache, each resource portion corresponding to a portion of a structured document for use by the client computing device to render the requested web page;

determining, by the server computing system, whether the client computing device has requested the web page within a predetermined time threshold since a previous request for the web page;
if the client computing device has requested the web page within the predetermined time threshold,
    instructing, by the server computing system, the client computing device to render the requested web page using the one or more resource portions stored in the cache, and
    refreshing the one or more resource portions, comprising:
        generating difference data, if any, for the one or more resource portions, wherein the difference data for the one or more resource portions indicates changes to be made to the one or more resource portions;
        instructing the client computing device to, in parallel with the generation of the difference data, render the one or more resource portions;
        sending the difference data to the client computing device; and
        instructing the client computing device to, based on the difference data, update the resource portions stored in the cache and render the updated resource portions; and
if the client computing device has not requested the web page within the predetermined time threshold,
    regenerating, by the server computer system, the one or more resource portions, and
    instructing, by the server computer system, the client computing device to render the requested web page using the regenerated one or more resource portions and cache the regenerated one or more resource portions.

2. The method of claim 1, further comprising determining if a user event has occurred affecting a state of the one or more resource portions since the one or more resource portions were last stored in the cache, and
    if the user event has occurred, regenerating the one or more resource portions to be stored in the cache based on the user event affecting the state of the one or more resource portions.

3. The method of claim 1, wherein the cache is stored in a persistent storage of the client computing device.

4. The method of claim 3, wherein the one or more resource portions are stored in the cache in an encrypted format, and rendering the requested web page using the one or more resource portions stored in the cache comprises decrypting the one or more resource portions.

5. The method of claim 3, further comprising erasing the cache in response to a user event.

6. The method of claim 5, wherein the user event comprises logging off from a web site from which the web page has been requested.

7. One or more computing devices associated with server computing system, the computing devices comprising:
    one or more processors; and
    one or more computer-readable non-transitory storage media embodying software that is configured when executed by one or more of the processors to:
    receive, by the server computing system, a request for a web page from a client computing device;
    identify, by the server computing system, one or more resource portions stored in a cache, each resource portion corresponding to a portion of a structured document for use by the client computing device to render the requested web page;
    determine, by the server computing system, whether the client computing device has requested the web page within a predetermined time threshold since a previous request for the web page;
    if the client computing device has requested the web page within the predetermined time threshold,
        instruct, by the server computing system, the client computing device to render the requested web page using the one or more resource portions stored in the cache, and
        refresh the one or more resource portions, comprising:
            generating difference data, if any, for the one or more resource portions, wherein the difference data for the one or more resource portions indicates changes to be made to the one or more resource portions;
            instructing the client computing device to, in parallel with the generation of the difference data, render the one or more resource portions;
            sending the difference data to the client computing device; and
            instructing the client computing device to, based on the difference data, update the resource portions stored in the cache and render the updated resource portions; and
    if the client computing device has not requested the web page within the predetermined time threshold,
        regenerate, by the server computer system, the one or more resource portions, and
        instruct, by the server computer system, the client computing device to render the requested web page using the regenerated one or more resource portions and cache the regenerated one or more resource portions.

8. The computing devices of claim 7, wherein the software is further configured to determine if a user event has occurred affecting a state of the one or more resource portions since the one or more resource portions were last stored in the cache, and
    if the user event has occurred, regenerate the one or more resource portions to be stored in the cache based on the user event affecting the state of the one or more resource portions.

9. The computing devices of claim 7, wherein the cache is stored in a persistent storage of the client computing device.

10. The computing devices of claim 9, wherein the one or more resource portions are stored in the cache in an encrypted format, and the software is further configured to render the requested web page using the one or more resource portions stored in the cache by decrypting the one or more resource portions.

11. The computing devices of claim 9, wherein the software is further configured to erase the cache in response to a user event.

12. The computing devices of claim 11, wherein the user event comprises logging off from a web site from which the web page has been requested.

13. One or more computer-readable non-transitory storage media embodying software that is configured when executed to:
    receive, by a server computing system, a request for a web page from a client computing device;
    identify, by the server computing system, one or more resource portions stored in a cache, each resource portion corresponding to a portion of a structured document for use by the client computing device to render the requested web page;

determine, by the server computing system, whether the client computing device has requested the web page within a predetermined time threshold since a previous request for the web page;

if the client computing device has requested the web page within the predetermined time threshold,
- instruct, by the server computing system, the client computing device to render the requested web page using the one or more resource portions stored in the cache, and
- refresh the one or more resource portions, comprising:
  - generating difference data, if any, for the one or more resource portions, wherein the difference data for the one or more resource portions indicates changes to be made to the one or more resource portions;
  - instructing the client computing device to, in parallel with the generation of the difference data, render the one or more resource portions;
  - sending the difference data to the client computing device; and
  - instructing the client computing device to, based on the difference data, update the resource portions stored in the cache and render the updated resource portions; and if the client computing device has not requested the web page within the predetermined time threshold,
- regenerate, by the server computer system, the one or more resource portions, and
- instruct, by the server computer system, the client computing device to render the requested web page using the regenerated one or more resource portions and cache the regenerated one or more resource portions.

14. The media of claim 13, wherein the software is further configured to determine if a user event has occurred affecting a state of the one or more resource portions since the one or more resource portions were last stored in the cache, and
- if the user event has occurred, regenerate the one or more resource portions to be stored in the cache based on the user event affecting the state of the one or more resource portions.

15. The media of claim 13, wherein the cache is stored in a persistent storage of the client computing device.

16. The media of claim 15, wherein the one or more resource portions are stored in the cache in an encrypted format, and the software is further configured to render the requested web page using the one or more resource portions stored in the cache by decrypting the one or more resource portions.

17. The media of claim 15, wherein the software is further configured to erase the cache in response to a user event.

18. The media of claim 17, wherein the user event comprises logging off from a web site from which the web page has been requested.

* * * * *